(12) United States Patent
Ito

(10) Patent No.: US 10,512,371 B2
(45) Date of Patent: *Dec. 24, 2019

(54) URINE COLLECTION RECEPTACLE AND TOILET

(71) Applicant: DAIKI CO., LTD., Tokyo (JP)

(72) Inventor: Hiroshi Ito, Tokyo (JP)

(73) Assignee: DAIKI CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/058,393

(22) Filed: Aug. 8, 2018

(65) Prior Publication Data

US 2018/0344104 A1 Dec. 6, 2018

Related U.S. Application Data

(63) Continuation of application No. PCT/JP2016/056207, filed on Mar. 1, 2016.

(51) Int. Cl.
*A47K 11/02* (2006.01)
*A01K 1/01* (2006.01)

(52) U.S. Cl.
CPC .............. *A47K 11/02* (2013.01); *A01K 1/011* (2013.01)

(58) Field of Classification Search
CPC ...................................................... A47K 11/02
USPC ............................................................ 4/479
See application file for complete search history.

(56) References Cited

U.S. PATENT DOCUMENTS

| 4,593,645 A | 6/1986 | Dingler |
| 5,003,920 A | 4/1991 | Miksitz |
| 5,148,771 A | 9/1992 | Schuett et al. |

FOREIGN PATENT DOCUMENTS

| JP | H05-009261 U | 2/1993 |
| JP | H10-229768 A | 9/1998 |
| JP | 2003-180182 A | 7/2003 |
| JP | 2006-204230 A | 8/2006 |
| JP | 2009-172319 A | 8/2009 |
| WO | 2014/007497 A1 | 1/2014 |

OTHER PUBLICATIONS

May 17, 2016 Written Opinion issued in International Patent Application No. PCT/JP2016/056207.
Mar. 4, 2019 Search Report issued in European Patent Application No. 16892489.

*Primary Examiner* — Lori L Baker
(74) *Attorney, Agent, or Firm* — Oliff PLC

(57) ABSTRACT

A urine collection receptacle has a box shape, and is to be installed in a toilet. The toilet includes a box-shaped main body part into which urine is excreted. The main body part has a bottom surface part and a side surface part. The side surface part is provided with a first opening from which the urine is discharged. A side surface part of the urine collection receptacle is provided with a second opening. The second opening allows the urine discharged from the first opening to flow into the urine collection receptacle.

20 Claims, 23 Drawing Sheets

URINE COLLECTION RECEPTACLE AND TOILET

CROSS REFERENCE TO RELATED APPLICATION

This is a Continuation of International Application No. PCT/JP2016/056207 filed Mar. 1, 2016. The contents of this application are hereby incorporated by reference in their entirety.

TECHNICAL FIELD

The present invention relates to a urine collection receptacle that is to be installed in a toilet for animal or human use, and a toilet including the urine collection receptacle.

BACKGROUND ART

The toilet disclosed in Patent Document 1 can be given as an example of a conventional toilet. The toilet described in this document is a toilet for animal use, and includes a box-shaped main body part and a partition member (a drainboard) disposed within the main body part. The inner space of the main body part is partitioned into upper and lower parts by the partition member. Many low-absorbency granules are provided in the space above the partition member. A water-absorbent sheet is provided in the space below the partition member. According to the toilet configured in this manner, animal urine passes among the granules and through the partition member, and is then absorbed by the water-absorbent sheet.

CITATION LIST

Patent Document

Patent Document 1: JP 2003-180182A

SUMMARY OF INVENTION

Technical Problem

According to the toilet described in Patent Document 1, urine absorbed by the water-absorbent sheet remains inside the main body part. If the urine gives off odor, that odor may rise up within the main body part and escape to the exterior of the toilet from the upper part of the main body part. This can cause discomfort for a user (the owner of the animal or the like).

The present inventor separately proposed a toilet capable of preventing the escape of odor. In the toilet, an opening through which urine passes is provided in a side surface part of a box-shaped main body part. Also, a bottom surface part of the main body part is inclined so that the urine excreted into the main body part flows to the opening.

In the toilet with such configuration, urine excreted into the main body part is discharged to the exterior of the main body part through the opening. Accordingly, the urine does not remain within the main body part, and thus odor produced by the urine can be prevented from escaping to the exterior of the toilet from the upper part of the main body part. However, the urine discharged to the exterior of the main body part needs to be treated by users.

Solution to Problem

Having been achieved in light of the foregoing issue, an object of the present invention is to provide a urine collection receptacle suitable for treating urine discharged to the exterior of a main body part of a toilet, and a toilet including the urine collection receptacle.

A urine collection receptacle according to the present invention is to be installed in a toilet including a box-shaped main body part into which urine is excreted, the main body part including a first bottom surface part and a first side surface part, the first side surface part being provided with a first opening from which the urine is discharged, the urine collection receptacle having a box shape. A second side surface part, which is a side surface part of the urine collection receptacle, is provided with a second opening that allows the urine discharged from the first opening to flow into the urine collection receptacle.

In this urine collection receptacle, the second opening is provided in a side surface part (the second side surface part). The second opening is provided so as to allow the urine discharged from the first opening to flow into the urine collection receptacle. Thus the urine discharged from the first opening to the exterior of the main body part can be taken into and collected in the urine collection receptacle. This makes it possible to easily dispose of the urine.

Advantageous Effects of Invention

According to the present invention, a urine collection receptacle suitable for treating urine discharged to the exterior of a main body part of a toilet, and a toilet including the urine collection receptacle can be realized.

DESCRIPTION OF EMBODIMENTS

Figure 1:
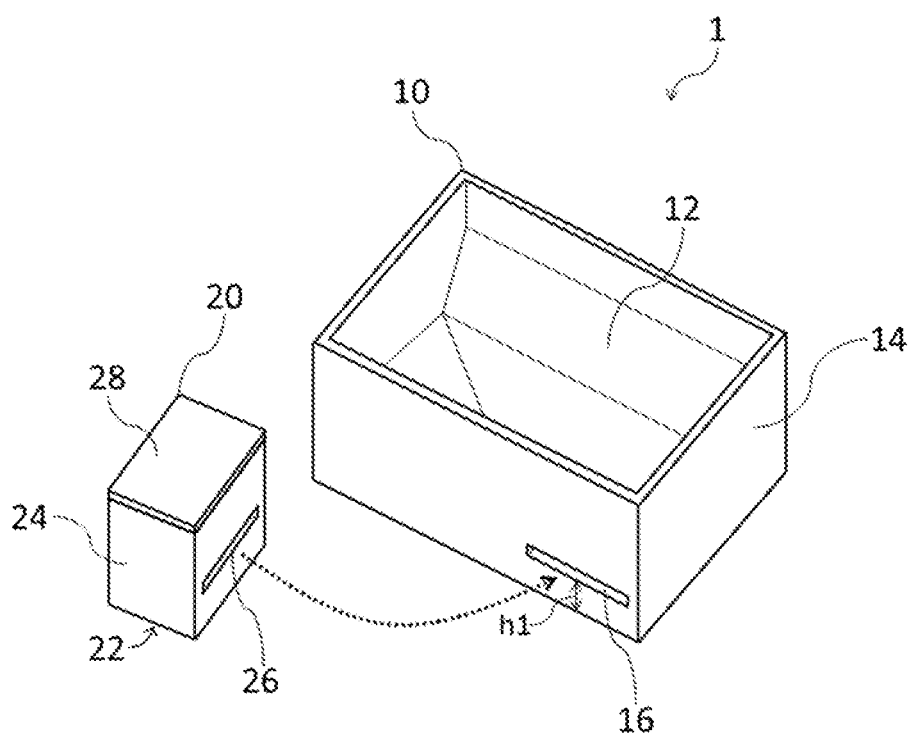
FIG. 1 is a perspective view illustrating an embodiment of a toilet according to the present invention.

Embodiments of the present invention will be described in detail hereinafter with reference to the drawings. In the drawings, identical elements are given identical reference signs, and descriptions thereof will not be repeated.

FIG. 1 is a perspective view illustrating an embodiment of a toilet according to the present invention. A toilet 1 is a toilet for animal or human use, and includes a main body part 10 and a urine collection receptacle 20. The main body part 10 is shaped as a box, and includes a bottom surface part 12 (a first bottom surface part) and a side surface part 14 (a first side surface part). An opening 16 (a first opening) is provided in the side surface part 14. The main body part 10 functions as a toilet bowl into which urine is excreted. A resin such as polypropylene or polyethylene can be used as the material of the main body part 10.

Figure 2:
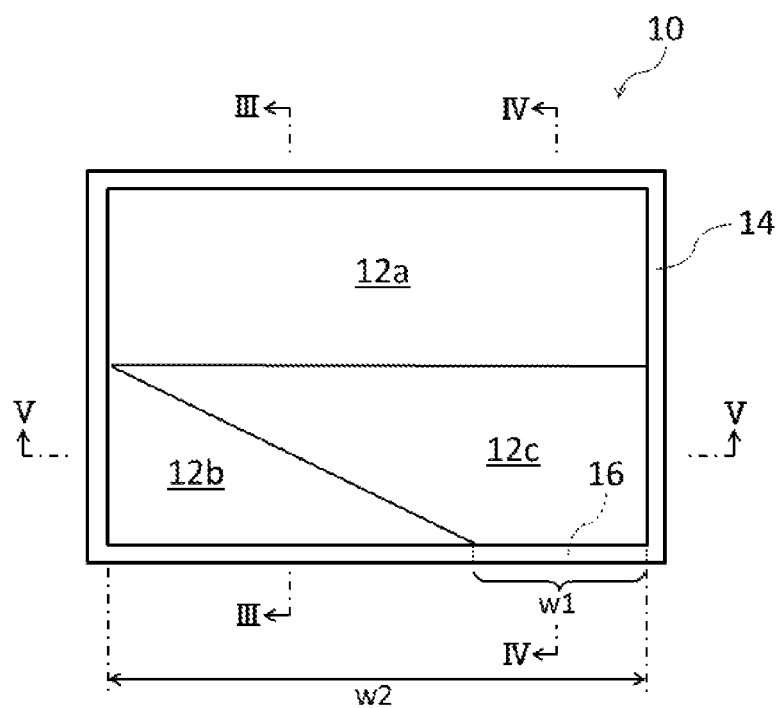
FIG. 2 is a plan view of a main body part 10 of the toilet of FIG. 1.

FIG. 2 is a plan view of the main body part 10. As can be seen from this diagram, the bottom surface part 12 is substantially rectangular when viewed in plan view. Accordingly, the main body part 10 is provided with four of the side surface parts 14. The outer shape of the main body part 10 is substantially a parallelepiped.

Figure 3:
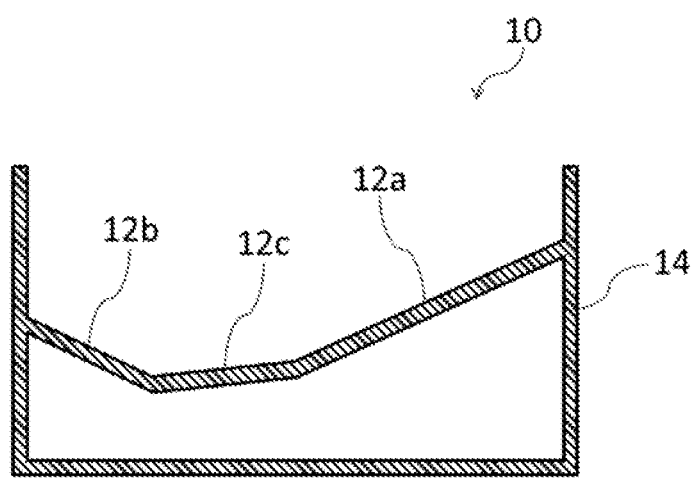
FIG. 3 is an end view taken along a line III-III in FIG. 2.
Figure 4:
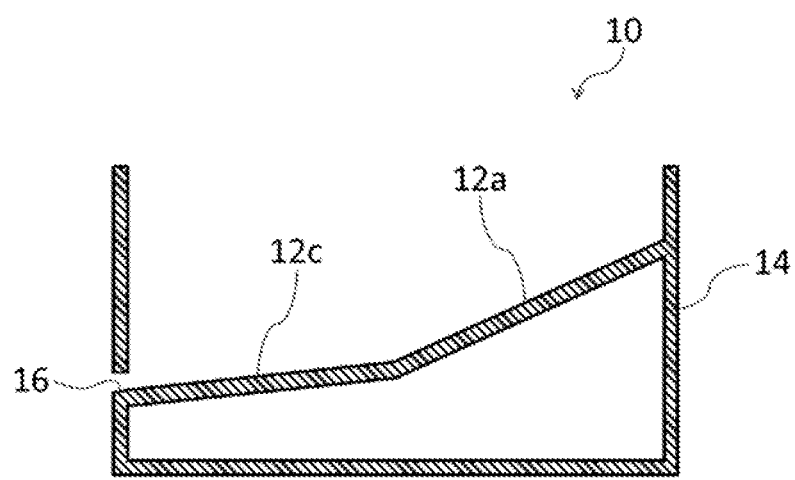
FIG. 4 is an end view taken along a line IV-IV in FIG. 2.
Figure 5:
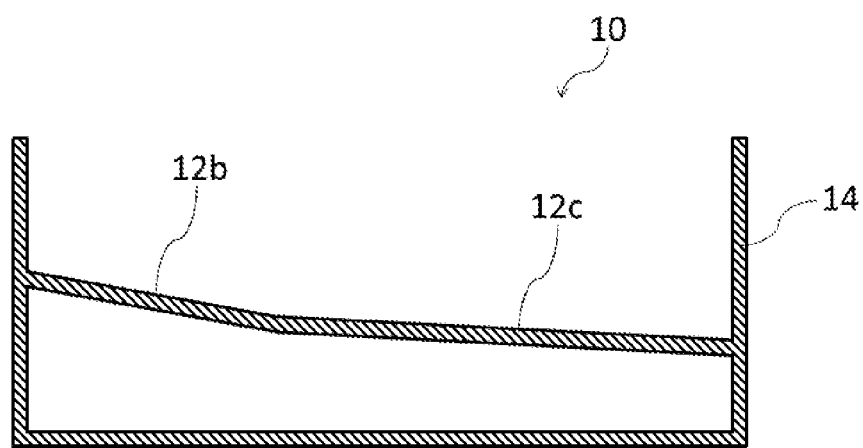
FIG. 5 is an end view taken along a line V-V in FIG. 2.

FIGS. 3, 4, and 5 are end views taken from a line III-III, a line IV-IV, and a line V-V, respectively, which are indicated in FIG. 2. As can be understood from these diagrams, the bottom surface part 12 is inclined such that the urine excreted into the main body part 10 flows to the opening 16. The bottom surface part 12 connects to the bottom surface of the opening 16. In the present embodiment, the entire bottom surface part 12 is inclined. The bottom surface part 12 is constituted by a plurality of connected flat surfaces 12a, 12b, and 12c. The flat surface 12a is inclined downward toward the flat surface 12c. The flat surface 12b is also inclined downward toward the flat surface 12c. The flat surface 12c is inclined downward toward the opening 16.

Returning to FIG. 1, the opening 16 is provided in one of the four side surface parts 14. The opening 16 has a horizontally long shape. The vertical length of the opening 16 (the length with respect to the vertical direction of the side surface parts 14) is greater than or equal to 3 mm and less than or equal to 10 mm, for example. The horizontal length of the opening 16 (the length with respect to the horizontal direction of the side surface part 14 in which the opening 16 is provided) is greater than or equal to 30 mm and less than or equal to 100 mm, for example. As illustrated in FIG. 2, a horizontal length w1 of the opening 16 is shorter than a horizontal width (inner dimension) w2 of the side surface part 14 in which the opening 16 is provided. The horizontal length w1 of the opening 16 is preferably less than or equal to ⅓ the horizontal width w2 of the side surface part 14.

Relative to a floor surface on which the main body part 10 is placed, a height h1 of the bottom end of the opening 16 (see FIG. 1) is preferably greater than or equal to 30 mm.

The height h1 is equal to the distance from the bottom end of the side surface part 14 to the bottom end of the opening 16. In the present embodiment, the opening 16 is located at an end area of the side surface part 14. In other words, one side end of the opening 16 is present in the same plane as the inner surface of a side surface part 14 adjacent to the side surface part 14 in which the opening 16 is provided. Additionally, as can be understood from FIG. 4, a bottom surface of the opening 16 is inclined downward toward the outside of the main body part 10. To rephrase, the bottom surface of the opening 16 is inclined downward from the inner surface of the side surface part 14 toward the outer surface of the side surface part 14. The opening 16 is a part that discharges urine, which has been excreted into the main body part 10, to the exterior of the main body part 10. The opening 16 allows urine to pass but does not allow granules 30, which will be described later, to pass.

Figure 6:
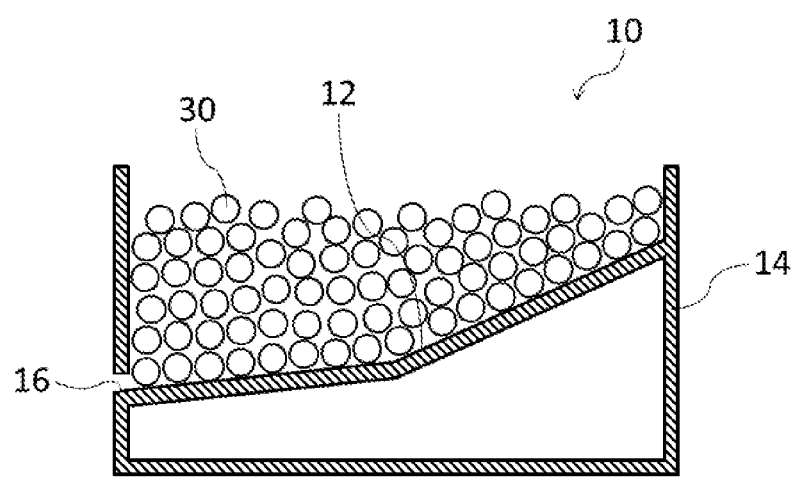
FIG. 6 is an end view illustrating the main body part 10 when in use.

FIG. 6 is an end view illustrating the main body part 10 when in use. This diagram illustrates the same end surface as that in FIG. 4. As illustrated in FIG. 6, when the toilet 1 is to be used, a plurality of granules 30 are laid within the main body part 10. The granules 30 are laid directly upon the bottom surface part 12. These granules 30 are a permeable toilet bedding material that allows urine to permeate. In other words, the granules 30 have a property of absorbing urine not at all or almost not at all. Preferably, the granules 30 have antibacterial properties. Preferably, the granules 30 also have anti-odor or deodorizing properties. For example, a non-absorbent or low-absorbency known toilet bedding material can be used as the granules 30.

Returning to FIG. 1, the toilet 1 is provided with the urine collection receptacle 20. The urine collection receptacle 20 is a receptacle that collects urine that has passed through the opening 16. The urine collection receptacle 20 is shaped as a box, and includes a bottom surface part 22 (a second bottom surface part) and a side surface part 24 (a second side surface part). The bottom surface part 22 is substantially rectangular when viewed in plan view. Accordingly, the urine collection receptacle 20 is provided with four of the side surface parts 24. The outer shape of the urine collection receptacle 20 is, like the outer shape of the main body part 10, substantially a parallelepiped. However, the volume of the urine collection receptacle 20 is lower than the volume of the main body part 10. Additionally, unlike the bottom surface part 12, the bottom surface part 22 is not inclined.

An opening 26 (a second opening) is provided in the side surface part 24. The opening 26 is provided to allow urine discharged from the opening 10 to flow into the urine collection receptacle 20. The opening 26 is provided in one of the four side surface parts 24. The opening 26 is substantially the same shape and size as the opening 16. Specifically, the shape and size of the opening 16 in the outer surface of the side surface part 14 substantially matches the shape and size of the opening 26 in the outer surface of the side surface part 24. Furthermore, the urine collection receptacle 20 has a cover part 28 that covers, from above, a space surrounded by the bottom surface part 22 and the side surface parts 24. The cover part 28 is provided so as to be openable and closable. The cover part 28 is closed while the toilet 1 is in use. With the exception of the opening 26, the interior of the urine collection receptacle 20 is sealed when the cover part 28 is closed. A resin such as polypropylene or polyethylene can be used as the material of the urine collection receptacle 20.

Figure 7:
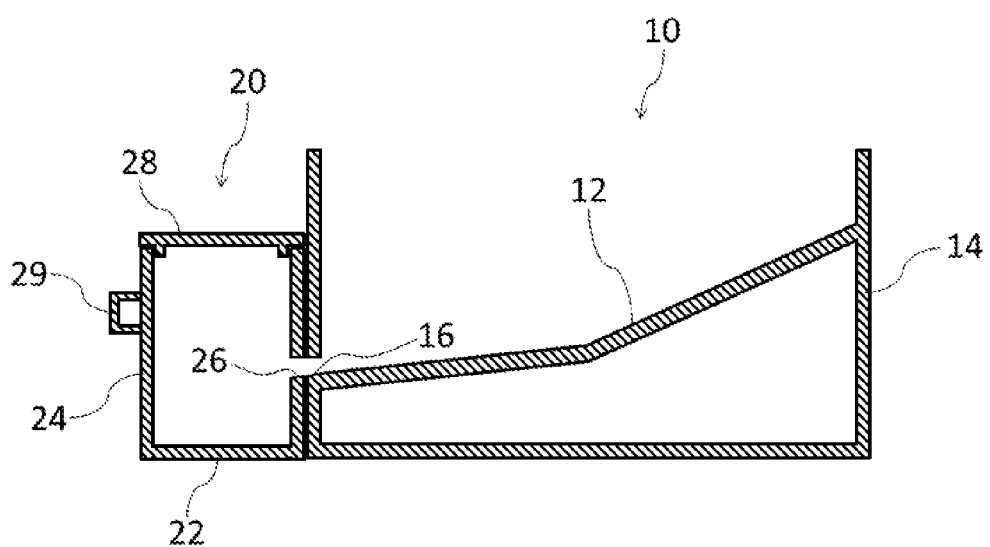
FIG. 7 is an end view illustrating a state where a urine collection receptacle 20 is arranged to the side of the main body part 10.

FIG. 7 is an end view illustrating a state where the urine collection receptacle 20 is arranged to the side of the main body part 10. As illustrated in this diagram, when the toilet 1 is in use, the urine collection receptacle 20 is arranged substantially flush against the side surface part 14 in which the opening 16 is provided. At this time, the opening 26 in the urine collection receptacle 20 overlaps with the opening 16 in the main body part 10. In the present embodiment, the opening 16 and opening 26 overlap with each other completely. In other words, the entirety of the opening 16 overlaps with the opening 26, and the entirety of the opening 26 overlaps with the opening 16. An upper end of the side surface part 24 is at a position higher than the upper end of the opening 16. A bottom surface of the opening 26 is inclined downward toward the inner side of the urine collection receptacle 20. To rephrase, the bottom surface of the opening 26 is inclined downward from the outer surface of the side surface part 24 toward the inner surface of the side surface part 24. The urine collection receptacle 20 is provided with a grip 29. Specifically, the grip 29 is provided in the side surface part 24 opposite from the side surface part 24 in which the opening 26 is provided.

The urine collection receptacle 20 is removably secured to the main body part 10. Here, "removable" means that the urine collection receptacle 20 can be easily attached to and removed from the main body part 10 without causing damage to the main body part 10 and the urine collection receptacle 20.

Figure 8:
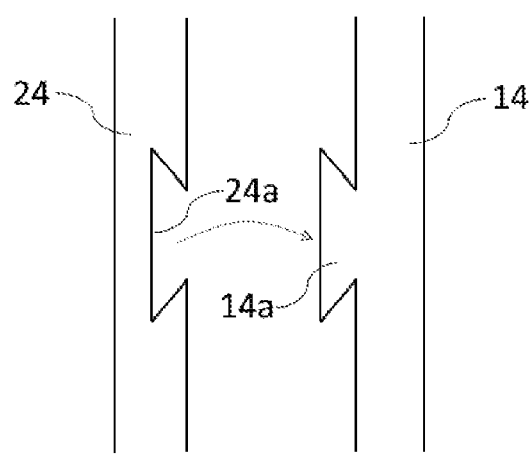
FIG. 8 is a diagram illustrating an example of a structure for removably securing the urine collection receptacle 20 to the main body part 10.

As illustrated in FIG. 8, this configuration can be realized by providing a projection 14a in the side surface part 14 and providing a groove 24a in the side surface part 24, for example. This diagram shows the side surface part 14 and the side surface part 24 from above. The projection 14a is provided in a part of the side surface part 14 that faces the side surface part 24. The projection 14a has a tapered cross-sectional shape in which the width widens as the projection 14a progresses away from the side surface part 14, and extends in the vertical direction of the side surface part 14 (the direction perpendicular to the plane of the diagram illustrated in FIG. 8). On the other hand, the groove 24a is provided in a part of the side surface part 24 that faces the side surface part 14. The groove 24a has a tapered cross-sectional shape in which the width widens as the groove 24a progresses toward the interior of the side surface part 24, and extends in the vertical direction of the side surface part 24. The cross-section of the groove 24a has substantially the same shape and size as the cross-section of the projection 14a.

Figure 9:
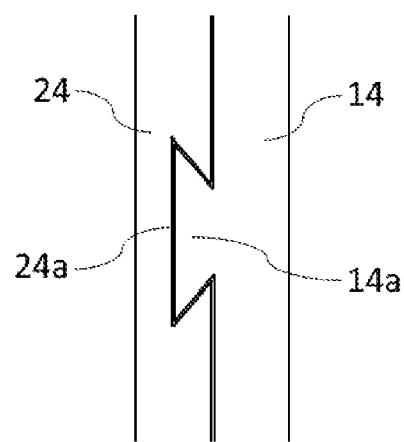
FIG. 9 is a diagram illustrating an example of a structure for removably securing the urine collection receptacle 20 to the main body part 10.

The urine collection receptacle 20 can be attached and secured to the main body part 10 by sliding the urine collection receptacle 20 in the vertical direction relative to the main body part 10 with the projection 14a fitted into the groove 24a as illustrated in FIG. 9. The urine collection receptacle 20 can be removed from the main body part 10 by sliding the urine collection receptacle 20 in the vertical direction relative to the main body part 10 and disengaging the projection 14a from the groove 24a.

Figure 10:
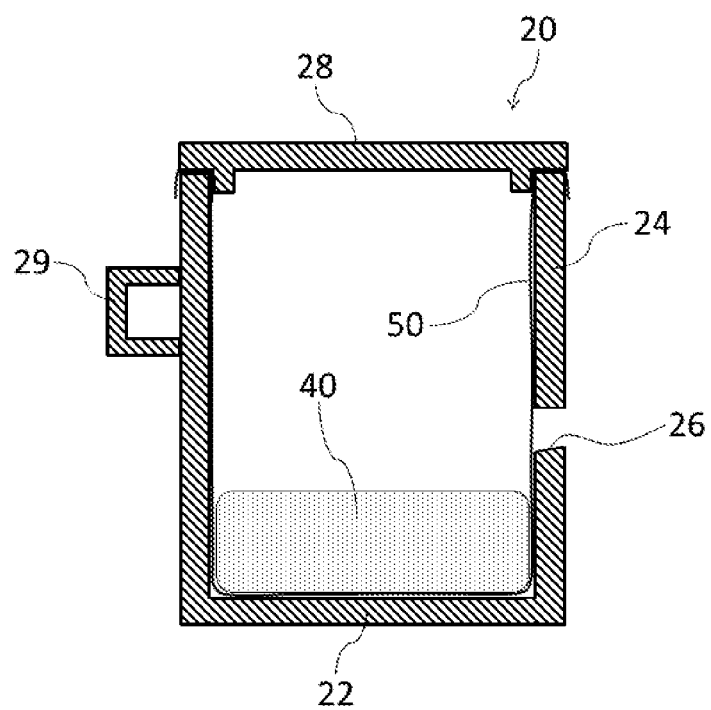
FIG. 10 is an end view illustrating the urine collection receptacle 20 when in use.

FIG. 10 is an end view illustrating the urine collection receptacle 20 when in use. As illustrated in this diagram, when the toilet 1 is in use, a water-absorbent material 40 that absorbs urine is provided within the urine collection receptacle 20. The absorbent material 40 is constituted by a mixture of a pulverized plant-based material and a water-absorbent polymer (a powder), for example. In this case, tea materials (tea leaves, tea husks, or the like) or coffee materials (coffee beans, instant coffee, coffee grounds, or the like) can be used as the plant-based material, for example. The branches of various types of plants, leaves (e.g., bamboo leaves), or flowers may be used as the plant-based material. Note that the water-absorbent material 40 may be constituted solely by a water-absorbent polymer. A granular toilet bedding material (e.g., obtained by pelletizing the above-described powder) or a sheet-type toilet bedding material (water-absorbent sheet) may be used as the water-absorbent material 40 as well.

The urine collection receptacle 20 is provided with a holding bag 50. The holding bag 50 is a bag that holds the water-absorbent material 40, and is provided within the urine collection receptacle 20. The holding bag 50 covers approximately the entirety of the upper surface of the bottom surface part 22 and the inner surfaces of the side surface parts 24. The holding bag 50 is folded over at the upper end of the side surface parts 24. The holding bag 50 is secured to the urine collection receptacle 20 by the folded-over part being sandwiched between the side surface parts 24 and the cover part 28.

Figure 11:
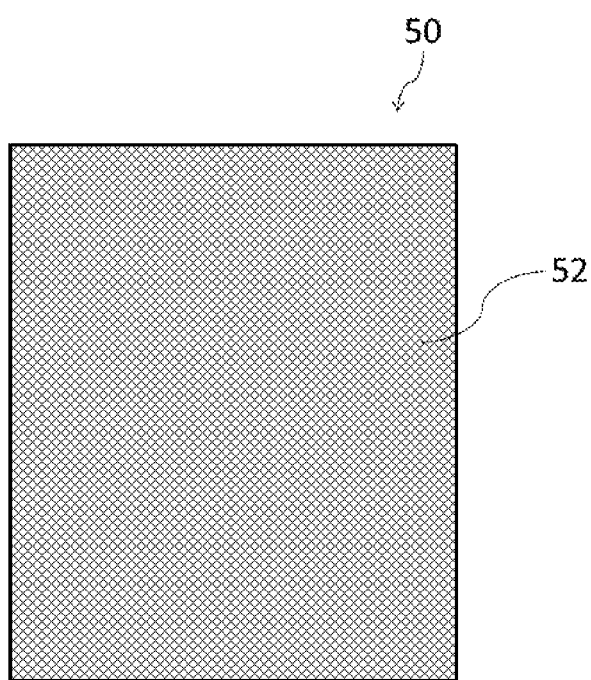
FIG. 11 is a front view illustrating a holding bag 50.

FIG. 11 is a front view of the holding bag 50. Holes 52 are provided in the holding bag 50. The holes 52 allow urine to pass but do not allow the water-absorbent material 40 to pass. In the present embodiment, at least part of the holding bag 50 (a part including a region overlapping with the opening 26) has a mesh form, and the mesh openings in that part constitute the holes 52. FIG. 11 illustrates an example in which the entire holding bag 50 has a mesh form. Polyethylene, polyvinyl chloride, nylon, and the like can be used as the material of the holding bag 50.

Effects of the present embodiment will be described. In this urine collection receptacle 20, the opening 26 is provided in the side surface part 24. The opening 26 is provided so as to allow the urine discharged from the opening 16 to flow into the urine collection receptacle 20. Thus the urine discharged from the opening 16 to the exterior of the main body part 10 can be taken into and collected in the urine collection receptacle 20. This makes it possible to easily dispose of the urine. Accordingly, the urine collection receptacle 20 suitable for treating urine discharged to the exterior of the main body part 10 of the toilet 1 is realized.

The opening 26 is provided in the side surface part 24 of the urine collection receptacle 20 in this way. Accordingly, the urine is taken into the urine collection receptacle 20 from the side surface part 24, and thus the height of the side surface part 24 can be increased. Increasing the height of the side surface part 24 is useful in terms of increasing the volume of the urine collection receptacle 20 and holding a larger amount of urine.

The urine collection receptacle 20 is arranged substantially flush against the side surface part 14 in which the opening 16 is provided. Thus the urine discharged from the opening 16 can be conducted directly into the urine collection receptacle 20 without providing means for transferring the urine between the main body part 10 and the urine collection receptacle 20.

The bottom surface of the opening 26 is inclined downward toward the inner side of the urine collection receptacle 20. This makes it possible for the urine discharged to the exterior of the main body part 10 to flow more smoothly through the opening 26 and into the urine collection receptacle 20.

The upper end of the side surface part 24 is at a position higher than the upper end of the opening 16 when the urine collection receptacle 20 is installed in the toilet 1. This makes it possible to prevent odor, which has been produced by urine accumulated within the urine collection receptacle 20, from flowing into the main body part 10 through the opening 16.

The urine collection receptacle 20 has the cover part 28 that covers, from above, the space surrounded by the bottom surface part 22 and the side surface parts 24. This makes it possible to prevent odor, which has been produced by urine accumulated within the urine collection receptacle 20, from escaping to the exterior from the upper part of the urine collection receptacle 20.

The urine collection receptacle 20 can be attached to and removed from the main body part 10. This makes it easy to dispose of urine that has accumulated in the urine collection receptacle 20, clean the main body part 10 and the urine collection receptacle 20, and so on. In other words, urine disposal, cleaning, and so on can be carried out more easily by removing the urine collection receptacle 20 from the main body part 10.

The urine collection receptacle 20 is provided with the grip 29. This makes it easy to attach and remove the urine collection receptacle 20 to and from the main body part 10.

Having the opening 16 (and the opening 26) at higher positions is useful for preventing urine that has accumulated in the urine collection receptacle 20 from leaking to the exterior of the urine collection receptacle 20 through the opening 26. From this standpoint, the height h1 of the bottom end of the opening 16 (see FIG. 1) is preferably greater than or equal to 30 mm.

When the toilet 1 is in use, the water-absorbent material 40 that absorbs urine is provided within the urine collection receptacle 20. This makes it more difficult for urine to leak to the exterior of the urine collection receptacle 20 than in a situation where the water-absorbent material 40 is not provided.

When the water-absorbent material 40 is a mixture of a pulverized plant-based material and a water-absorbent polymer, a deodorizing effect of the plant-based material makes it possible to reduce urine odor. The absorbency effect of the water-absorbent polymer makes it possible to absorb a greater amount of urine.

A particularly good deodorizing effect can be achieved by using a tea material or coffee material as the plant-based material. Using refuse such as tea husks or coffee grounds makes it possible to put such refuse to good use as well.

The urine collection receptacle 20 is provided with the holding bag 50. Accordingly, the water-absorbent material 40 that has absorbed urine can be removed along with the holding bag 50 from the urine collection receptacle 20. This makes it even easier to dispose of urine that has accumulated in the urine collection receptacle 20.

The holes 52, which allow urine to pass without allowing the water-absorbent material 40 to pass, are provided in the holding bag 50. This makes it possible to conduct urine that has passed through the opening 26 into the holding bag 50 while preventing the water absorbent material 40 from spilling outside of the holding bag 50.

At least part of the holding bag 50 has a mesh form, and the mesh openings in that part constitute the holes 52. This makes it possible to realize the holding bag 50 having the holes 52 with a simple configuration.

The opening 16 is provided in the side surface part 14 of the main body part 10. The bottom surface part 12 of the main body part 10 is inclined such that urine flows to the opening 16. Accordingly, urine excreted into the main body part 10 passes among the granules 30, flows upon the bottom surface part 12, and then reaches the opening 16. The urine that has reached the opening 16 passes through the opening 16 and is discharged to the exterior of the main body part 10. Accordingly, the urine does not remain within the main body part 10, and thus odor produced by the urine can be prevented from escaping to the exterior of the toilet 1 from the upper part of the main body part 10.

For the main body part 10 to function as a toilet bowl, it is necessary to make the opening in the upper part thereof wide. As such, if urine in the main body part 10 produces odor, it is difficult to prevent that odor from escaping from the upper part of the main body part 10. Thus in order to prevent such odor from escaping, it is important to ensure that urine does not remain in the main body part 10, as in the present embodiment.

Providing the main body part 10 with a cover is conceivable as a way of preventing odor from escaping from the upper part of the main body part 10. However, for the main body part 10 to function as a toilet bowl, it is necessary to open the cover at least during use. In particular, if the toilet 1 is to be used as a toilet for animal use, it is difficult for an animal to open/close the cover itself, which makes it necessary to keep the cover open even when the toilet is not in use. Thus even if a cover is provided, the cover cannot completely prevent odor from escaping from the upper part of the main body part 10. With respect to this point, according to the present embodiment, urine excreted into the main body part 10 is discharged to the exterior of the main body part 10, which makes it possible to fundamentally solve the problem of odor escaping from the upper part of the main body part 10.

The entirety of the bottom surface part 12 is inclined. As such, urine can be reliably conducted to the opening 16 regardless of on what position of the bottom surface part 12 the urine has been excreted.

The opening 16 has a horizontally long shape. In other words, the opening 16 is longer horizontally and shorter vertically. A liquid such as urine has a tendency to spread out horizontally. As such, increasing the horizontal length of the opening 16 facilitates the quick passage of a large amount of urine. Thus even if a large amount of urine has been excreted, that urine can be smoothly discharged to the exterior of the main body part 10 through the opening 16. On the other hand, reducing the vertical length of the opening 16 is useful in terms of preventing the granules 30 from passing through the opening 16.

The horizontal length of the opening 16 is shorter than the horizontal width of the side surface part 14 in which the opening 16 is provided. In other words, the opening 16 is provided in only part of the side surface part 14 with respect to the horizontal direction of the side surface part 14. Thus compared to a situation where the opening 16 is provided across the entire side surface part 14, it is easier to prevent odor produced by the urine discharged to the exterior of the main body part 10 from flowing into the main body part 10 through the opening 16. From this standpoint, the horizontal length of the opening 16 is preferably less than or equal to ⅓ the horizontal width of the side surface part 14.

The bottom surface of the opening 16 is inclined downward toward the outside of the main body part 10. This makes it possible for urine excreted into the main body part 10 to be more smoothly discharged to the exterior of the main body part 10 through the opening 16.

The granules 30 are laid directly upon the bottom surface part 12. It is therefore not necessary to provide a partition member between the granules 30 and the bottom surface part 12 in the main body part 10. This makes it possible to avoid complicating the structure of the main body part 10, and by extension, the toilet 1.

Figure 12:
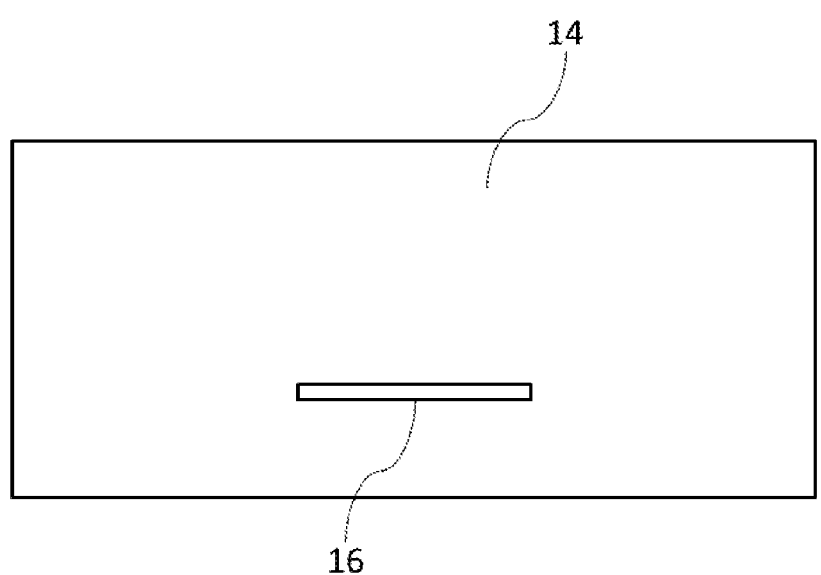
FIG. 12 is a diagram illustrating a variation on an opening 16.
Figure 13:
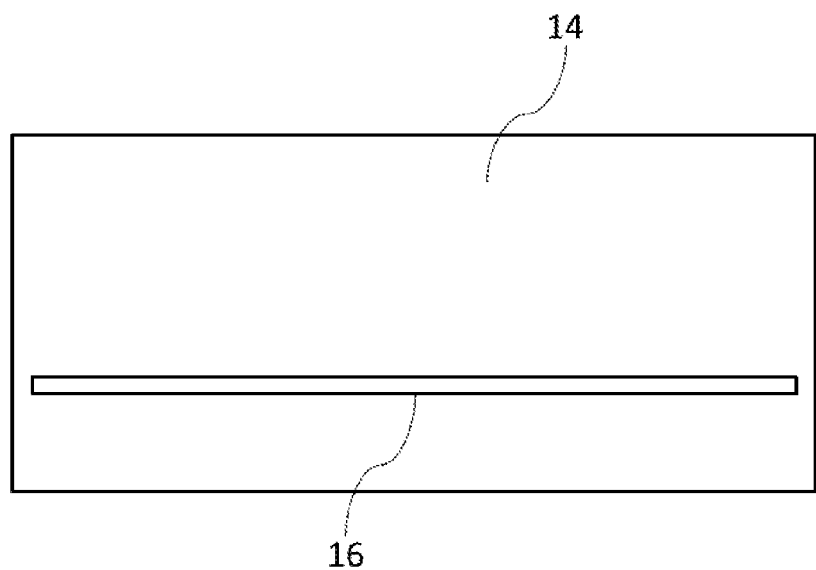
FIG. 13 is a diagram illustrating another variation on the opening 16.
Figure 14:
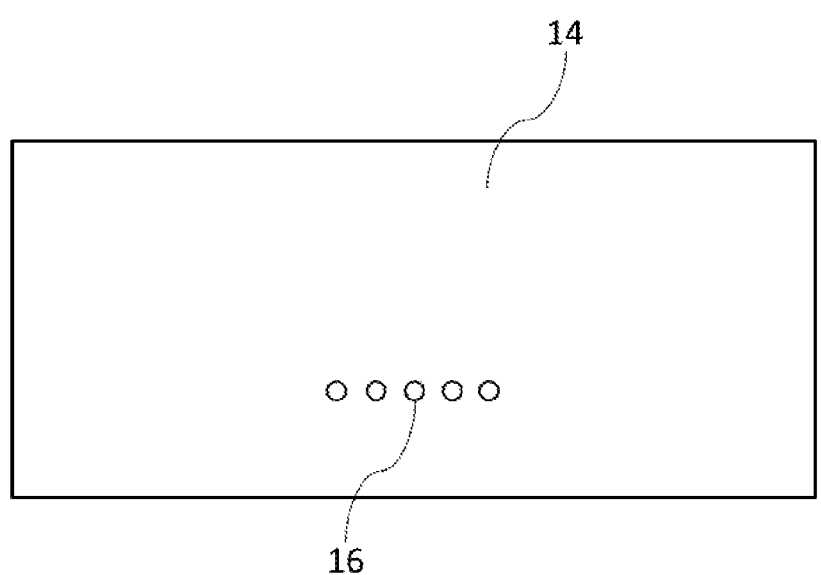
FIG. 14 is a diagram illustrating another variation on the opening 16.

The present invention is not limited to the foregoing embodiment, and many variations can be made thereon. In the foregoing embodiment, the shape, size, position, and number of the opening 16 can be set as desired. As illustrated in FIG. 12, the opening 16 may be located in a central area of the side surface part 14 instead of an end area. As illustrated in FIG. 13, the opening 16 may be provided across the entire side surface part 14 with respect to the horizontal direction of the side surface part 14. In this case, both side ends of the opening 16 are present in the same plane as the inner surfaces of the side surface parts 14 adjacent to the side surface part 14 in which the opening 16 is provided. Additionally, as illustrated in FIG. 14, a plurality of openings 16 may be provided. In this diagram, five openings 16 that are circular when viewed from the front are provided. These openings 16 are arranged at equal intervals along a straight line, in the horizontal direction of the side surface part 14. Similarly, the shape, size, position, and number of the opening 26 may be set as desired.

The foregoing embodiment describes an example in which only one urine collection receptacle 20 is provided. However, the toilet 1 may include a plurality of urine collection receptacles 20 having different volumes. In this case, the urine collection receptacle 20 having the appropriate volume can be selected in accordance with the number of days over which urine is to be retained in the urine collection receptacle 20 (how frequently the urine that has accumulated in the urine collection receptacle 20 is disposed of). For example, it is conceivable to prepare four urine collection receptacles 20, i.e., a urine collection receptacle 20 having a volume suited to retaining one day's worth of urine, a urine collection receptacle 20 having a volume suited to retaining two days' worth of urine, a urine collection receptacle 20 having a volume suited to retaining three days' worth of urine, and a urine collection receptacle 20 having a volume suited to retaining seven days' worth of urine, and then use these receptacles as appropriate.

In the foregoing embodiment, the granules 30 may be made of a chemically-integrated resin. "Made of a chemically-integrated resin" means that the entirety of the resin constituting each of the granules 30 is chemically integrated. A single mass formed by intertwining a plurality of resin pieces, a single mass formed by bonding a plurality of resin pieces together using a binder or the like, and so on do not constitute a "chemically-integrated resin". The granules 30 can be obtained by molding melted resin using a mold, as with injection molding or blow molding, for example. A resin such as polypropylene or polyethylene can be used as the material of the granules 30.

When the granules 30 are made of a chemically-integrated resin, granules 30 having a property of absorbing no urine whatsoever can be achieved with ease. With granules obtained by compacting crushed materials, as with the granules described in Patent Document 1, it is difficult to achieve complete nonabsorbency. This is because with such granules, gaps are present between the crushed materials even if a nonabsorbent material is used, and thus urine can penetrate through those gaps. Odor produced from urine absorbed by the granules also leads to odor escaping from the upper part of the main body part 10. As such, having the granules 30 absorbed no urine whatsoever is useful in terms of preventing such odor from escaping.

Figure 15:
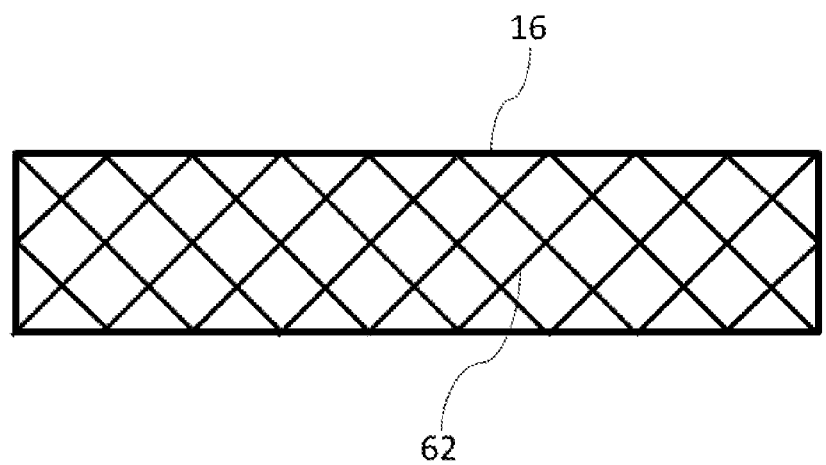
FIG. 15 is a diagram illustrating an example of a stopper member 62 provided in the opening 16.
Figure 16:
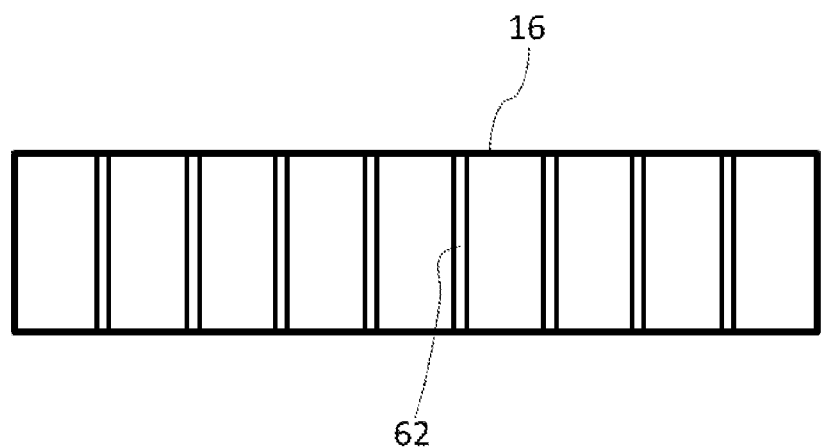
FIG. 16 is a diagram illustrating another example of the stopper member 62 provided in the opening 16.

In the foregoing embodiment, the opening 16 may be provided with a stopper member 62 that partially covers the opening 16, as illustrated in FIGS. 15 and 16. In FIG. 15, the stopper member 62 has a mesh form. In FIG. 16, the stopper member 62 has a grate form. Providing the stopper member 62 makes it possible to more reliably prevent the granules 30 from spilling to the exterior of the main body part 10 through the opening 16.

Figure 17:
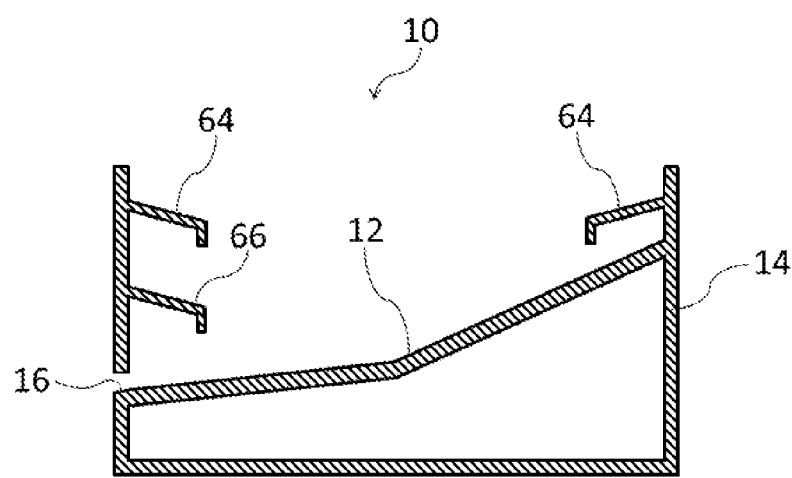
FIG. 17 is a diagram illustrating a variation on the main body part 10.
Figure 18:
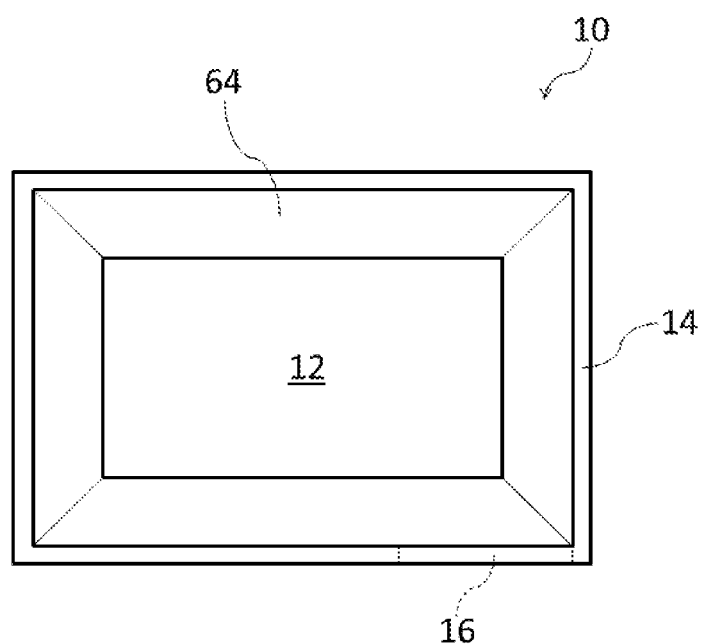
FIG. 18 is a diagram illustrating the structure of a shielding member 64 indicated in FIG. 17.
Figure 19:
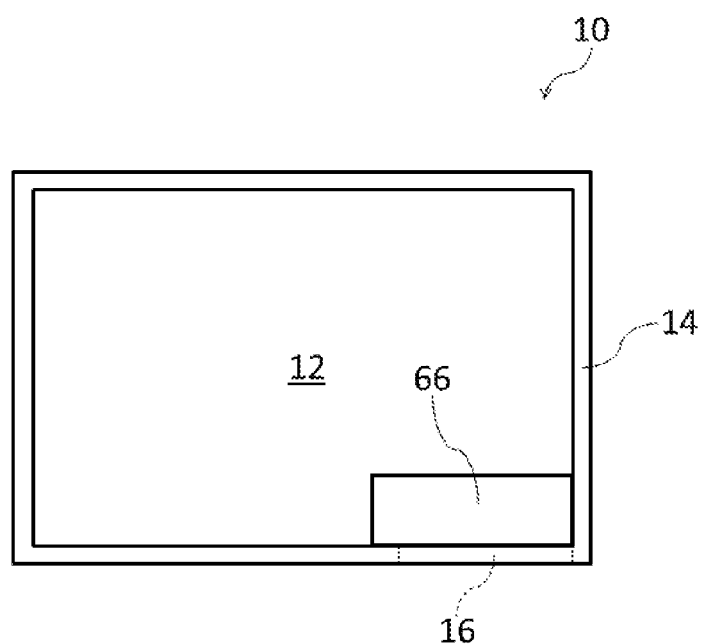
FIG. 19 is a diagram illustrating the structure of a shielding member 66 indicated in FIG. 17.

In the foregoing embodiment, shielding members 64 and 66 that block the rise of odor from urine may be provided in the main body part 10, as illustrated in FIGS. 17 to 19. FIGS. 18 and 19 are plan views illustrating the main body part 10 of FIG. 17. Note that the shielding member 64 is not illustrated in FIG. 19. The shielding members 64 and 66 have plate shapes, and project into the main body part 10 from the inner surfaces of the side surface parts 14. The shielding members 64 and 66 are inclined downward toward the inside of the main body part 10. The shielding members 64 and 66 are also partially bent downward. Specifically, parts of the shielding members 64 and 66 near the leading ends thereof are bent so as to face downward in the vertical direction. The shielding member 66 is located between the shielding member 64 and the bottom surface part 12 with respect to the vertical direction of the side surface parts 14. The shielding member 64 is, when viewed in plan view, provided across the entire inner surfaces of the side surface parts 14, as can be understood from FIG. 18. In other words, the shielding member 64 is provided in an annular shape. Thus while there is an opening in the parts surrounded by the shielding member 64, that opening is large enough to not interfere with the passage of the granules 30. On the other hand, the shielding member 66 is, when viewed in plan view, provided in only part of the inner surfaces of the side surface parts 14 (a part including the area where the opening 16 is provided), as can be understood from FIG. 19.

Providing the shielding members 64 and 66 blocks odor rising from urine within the main body part 10, and can therefore prevent odor from escaping from the upper part of the main body part 10. Moreover, because the shielding members 64 and 66 are inclined downward toward the inner side of the main body part 10, odor can be trapped in the space between the lower surfaces of the shielding members 64 and 66 and the inner surfaces of the side surface parts 14. This makes it possible to enhance the odor-blocking effect. Furthermore, the shielding members 64 and 66 are partially bent downward. It is therefore difficult for the odor trapped by the shielding members 64 and 66 to escape to the exterior of the shielding members 64 and 66. This makes it possible to enhance the odor-blocking effect even more. Additionally, the shielding member 66 covers the area above the vicinity of the entrance to the opening 16. Thus even if odor from urine discharged to the exterior of the main body part 10 has flowed into the main body part 10 through the opening 16, that odor can be effectively blocked from rising.

Figure 20:
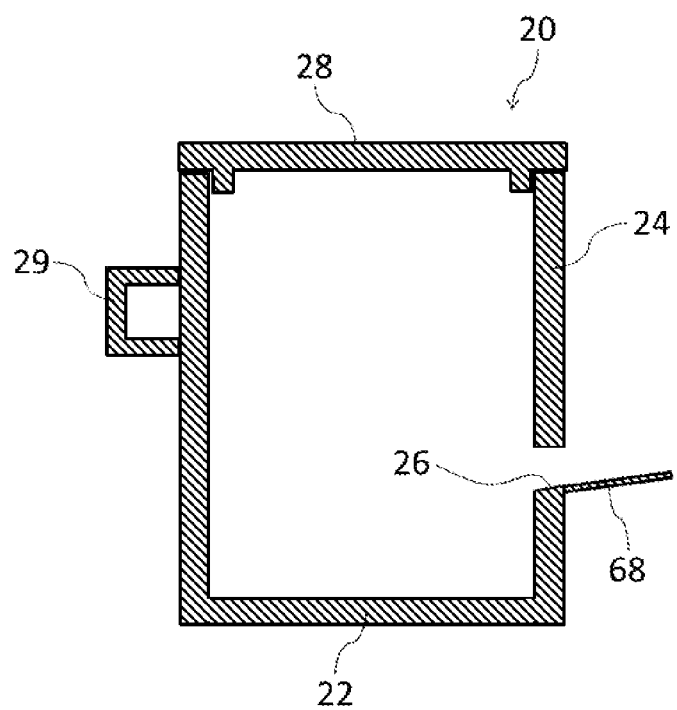
FIG. 20 is a diagram illustrating a variation on the urine collection receptacle 20.
Figure 21:
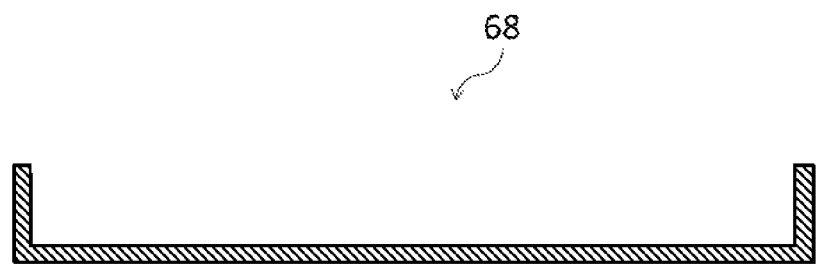
FIG. 21 is a diagram illustrating the structure of a cross-link member 68 indicated in FIG. 20.
Figure 22:
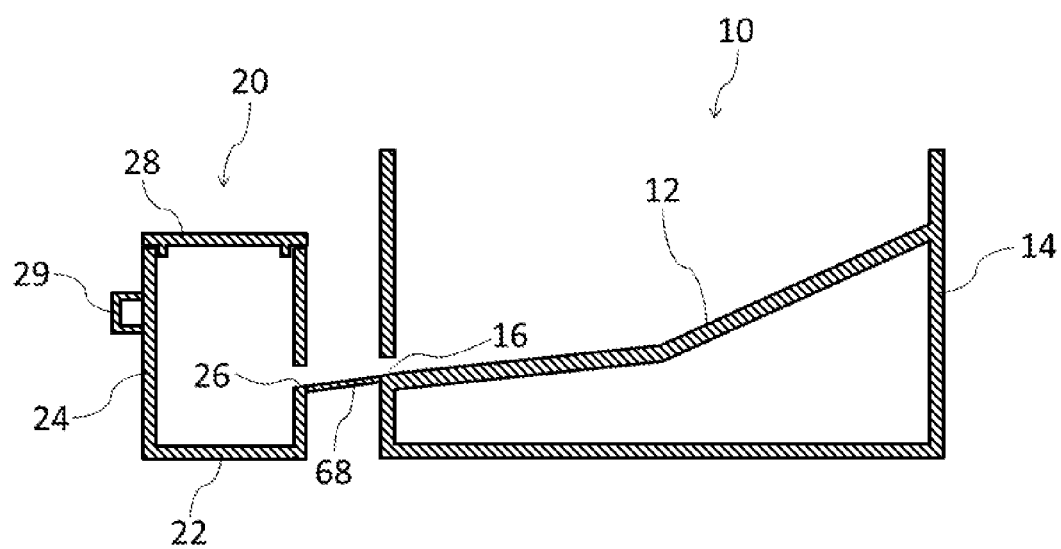
FIG. 22 is an end view illustrating a state where the urine collection receptacle 20 indicated in FIG. 20 is arranged to the side of the main body part 10.

In the foregoing embodiment, a cross-link member 68 may be provided in the urine collection receptacle 20, as illustrated in FIG. 20. The cross-link member 68 is fixed to the urine collection receptacle 20, and protrudes outside the urine collection receptacle 20. The cross-link member 68 connects to the bottom surface of the opening 26, and serves as a channel for urine that flows into the opening 26. The cross-link member 68 is inclined upward toward the outside of the urine collection receptacle 20. As illustrated in FIG. 21, both ends of the cross-link member 68 are higher than a central area to prevent urine flowing thereon from spilling. This diagram illustrates a vertical cross-section in the direction in which the cross-link member 68 protrudes. As illustrated in FIG. 22, during use, the urine collection receptacle 20 is set so that the opening 16 and the opening 26 are bridged by the cross-link member 68. In this case, the opening 26 is provided at a lower position than the opening 16. According to this configuration, urine discharged from the opening 16 can be conducted into the urine collection receptacle 20 through the cross-link member 68 even if the urine collection receptacle 20 is set in a position distanced from the main body part 10. Note that the configuration may be such that the cross-link member 68 can be stored or removed when not in use.

Figure 23:
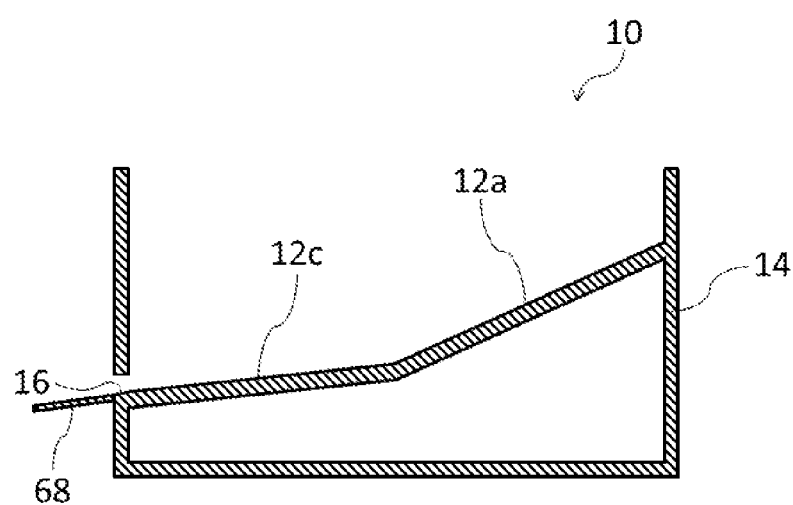
FIG. 23 is an end view of the main body part 10 provided with the cross-link member 68.

As illustrated in FIG. 23, the cross-link member 68 may be provided in the main body part 10. In this diagram, the cross-link member 68 is fixed to the main body part 10, and protrudes outside the main body part 10. The cross-link member 68 connects to the bottom surface of the opening 16, and serves as a channel for urine that has passed through the opening 16. In this case, the cross-link member 68 is inclined downward toward the outside of the main body part 10.

LIST OF REFERENCE NUMERALS

1 Toilet
10 Main body part
12 Bottom surface part (first bottom surface part)
12a, 12b, 12c Flat surface
14 Side surface part (first side surface part)
14a Projection
16 Opening (first opening)
20 Urine collection receptacle
22 Bottom surface part (second bottom surface part)
24 Side surface part (second side surface part)
24a Groove
26 Opening (second opening)
28 Cover part
29 Grip
30 Granule
40 Water-absorbent material
50 Holding bag
52 Hole
62 Stopper member
64 Shielding member
66 Shielding member
68 Cross-link member

The invention claimed is:

1. A urine collection receptacle configured to be installed in a toilet that includes a box-shaped main body part into which urine is excreted, the box-shaped main body part including a first bottom surface part and a first side surface part, the first side surface part including a first opening from which the urine is discharged, the urine collection receptacle comprising:
   a second side surface part, the second side surface part having a second opening configured to allow the urine discharged from the first opening to flow into the urine collection receptacle,
   wherein the urine collection receptacle has a box shape.

2. The urine collection receptacle according to claim 1, wherein the urine collection receptacle is configured to be arranged substantially flush against the first side surface part.

3. The urine collection receptacle according to claim 1, further comprising:
   a cover part that covers, from above, a space surrounded by (a) a second bottom surface part of the urine collection receptacle and (b) the second side surface part.

4. The urine collection receptacle according to claim 1, wherein a bottom surface of the second opening is inclined downward toward the inside of the urine collection receptacle.

5. The urine collection receptacle according to claim 1, wherein the urine collection receptacle is configured to be attached to and removed from the main body part.

6. The urine collection receptacle according to claim 1, wherein the urine collection receptacle includes a grip.

7. The urine collection receptacle according to claim 1, wherein the urine collection receptacle includes a water-absorbent material that absorbs the urine.

8. The urine collection receptacle according to claim 7, wherein the urine collection receptacle includes a holding bag that holds the water-absorbent material.

9. The urine collection receptacle according to claim 8, wherein the holding bag includes a hole that allows the urine to pass but does not allow the water-absorbent material to pass.

10. The urine collection receptacle according to claim 1, further comprising:
    a cross-link member protruding outside the urine collection receptacle,
    wherein the cross-link member connects to a bottom surface of the second opening and serves as a channel for the urine that flows into the second opening.

11. The urine collection receptacle according to claim 10, wherein the cross-link member is inclined upward toward the outside of the urine collection receptacle.

12. A toilet comprising:
    the urine collection receptacle according to claim 1; and
    the main body part.

13. The toilet according to claim 12,
    wherein the urine collection receptacle includes a plurality of urine collection receptacles, each of the plurality of urine collection receptacles having different volumes.

14. The toilet according to claim 12,
    wherein the first bottom surface part is inclined so that the urine excreted into the main body part flows to the first opening.

15. The toilet according to claim 14,
    wherein the entirety of the first bottom surface part is inclined.

16. The toilet according to claim 12,
    wherein a bottom surface of the first opening is inclined downward toward the outside of the main body part.

17. The toilet according to claim 12,
    wherein the first opening includes a stopper member that partially covers the first opening.

18. The toilet according to claim 12, further comprising:
    a shielding member protruding from an inner surface of the first side surface part toward the inside of the main body part, the shielding member blocking odor from the urine from rising.

19. The toilet according to claim 18,
    wherein the shielding member is inclined downward toward the inside of the main body part.

20. The toilet according to claim 18,
    wherein the shielding member is partially bent downward.

* * * * *